(12) United States Patent
Powell et al.

(10) Patent No.: US 6,170,801 B1
(45) Date of Patent: Jan. 9, 2001

(54) VALVE CLOSURE SYSTEM

(75) Inventors: Duane Powell; Robert B. Bebow, both of Alma, MI (US)

(73) Assignee: Powell Fabrication & Manufacturing, Inc., St. Louis, MI (US)

(*) Notice: Under 35 U.S.C. 154(b), the term of this patent shall be extended for 0 days.

(21) Appl. No.: 09/493,683

(22) Filed: Jan. 28, 2000

Related U.S. Application Data

(60) Provisional application No. 60/117,978, filed on Jan. 29, 1999.

(51) Int. Cl.[7] .......................... F16K 31/12; F16K 31/44; F16M 1/00
(52) U.S. Cl. .......................... 251/271; 251/59; 251/77; 248/674
(58) Field of Search ................ 251/59, 77, 270, 251/266, 271; 248/674

(56) References Cited

U.S. PATENT DOCUMENTS

| | | | |
|---|---|---|---|
| 676,118 | * | 6/1901 | Billings .................. 137/542 |
| 1,928,071 | * | 9/1933 | Mueller ................... 251/282 |
| 4,024,886 | * | 5/1977 | Eberhardt et al. ........ 137/270 |
| 4,359,203 | * | 11/1982 | Cho ....................... 251/77 |
| 4,441,684 | * | 4/1984 | Credle, Jr. .............. 248/674 |
| 5,356,285 | * | 10/1994 | Kim ....................... 431/18 |
| 5,560,586 | * | 10/1996 | Aruga et al. ............. 251/298 |

* cited by examiner

Primary Examiner—Kevin Shaver
Assistant Examiner—D A Bonderer
(74) Attorney, Agent, or Firm—George L. Boller

(57) ABSTRACT

A valve closure system for rotating a rotatable actuator of a valve relative to a body of the valve to operate the valve from open to closed. The system contains a motor having a rotatable shaft, a mounting that comprises plural parts including a bracket, for associating the motor with the valve, and a coupling for coupling the motor shaft to the valve actuator to impart rotation of the motor shaft to the valve actuator to operate the valve closed. The bracket comprises a plate having a surface defining a notch that has a) an entrance at a perimeter of the plate and b) a shape enabling the plate to associate with the valve body by i) disposing the plate alongside the valve body with the notch entrance aligned with the valve body and ii) then moving the plate laterally of the valve actuator axis to cause of the valve body to pass through the notch entrance and enter the notch. One of the parts, namely a pin, is disposed on the plate and protrudes from the plate to present a dimensional interference with the valve body axially, as measured along the actuator axis, beyond the portion of the valve body disposed within the notch, for keeping the valve body disposed in the notch and preventing the plate from rotating on the valve body as the motor operates to close the valve.

19 Claims, 4 Drawing Sheets

VALVE CLOSURE SYSTEM

REFERENCE TO RELATED APPLICATION AND PRIORITY CLAIM

This application expressly claims the benefit of earlier filing date and right of priority from the following patent application: U.S. Provisional Application Ser. No. 60/117, 978 filed on Jan. 29, 1999 in the names of Duane Powell and Robert Bebow and bearing the same title. The entirety of that earlier-filed, co-pending patent application is hereby expressly incorporated herein by reference.

FIELD OF THE INVENTION

This invention relates to a valve closure system comprising a motor for turning a rotary actuator of a valve to operate the valve from open to closed. Such valve closure systems allow valves of vessels, such as cylinders and containers, that hold fluids, such as industrial gases for example, to be quickly operated from a remote location.

BACKGROUND OF THE INVENTION

Various types of transportable vessels are used for packaging various commercial and industrial gases at superatmospheric pressure. One type of vessel is a gas cylinder, an example of which is an elongate metal tank adapted to contain gas at relatively high pressure. An upper axial end of the cylinder has a neck containing an opening to the interior. A shut-off valve is mounted in closure of the neck opening. Another type is a container, a vessel that may have substantially larger volume than a cylinder. A container may have several such shut-off valves each mounted in closure of a respective opening in the container wall.

A representative shut-off valve comprises a first port fitted in sealed relation to an opening in a vessel wall, a second port, and a valve mechanism that is operable via an external actuator, or tool, to allow and disallow fluid communication between the two ports. The second port is externally available for connection to a gas supply source when the cylinder is to be filled and for connection to a gas utilization system at a facility that uses gas stored in the cylinder. The valve mechanism comprises a stem that is rotated by an external actuator or tool to open and close the valve. An external actuator may be either manual or powered. A knob or handle that is turned by hand is an example of a manual actuator. An electric- or pneumatic-powered prime mover is an example of a power actuator. A wrench is an example of a hand tool for turning the valve stem. The term "actuator" includes the stem.

The representative valve may be a globe style valve whose stem is rotatable more than one full turn between closed and full open positions. Opening the valve allows contained gas to pass from the vessel by entering the first port, flowing through the valve, and exiting via the second port. In such case, the first port forms a gas inlet connected to the vessel, and the second port a gas outlet. The gas outlet may be connected via a conduit to a point of use of the gas.

Such vessels can hold gases that may be considered hazardous, examples of such gases including chlorine and sulfur dioxide. A facility that utilizes one or more of such gases in a process, or processes, conducted at the facility may, for example, have any number of such vessels containing the same or different gases on the premises. When connected to a gas handling system at the facility, such vessels are able to deliver gas, or gases, into the system once their shut-off valves have been opened. Because of inherent characteristics of certain gases, vessels that contain them may be housed in locations that are remote from attending personnel, and/or the vessels may be in use at times when personnel are absent.

When a vessel, or vessels, is, or are, in use at a facility, and gas leakage is detected, it may be appropriate to shut off all vessels in an attempt to minimize further gas leakage. Accordingly, an automatic gas leak detection and valve shut-off system may be employed at a facility to address such a situation. Such a system may include a power actuator associated with the shut-off valve of each vessel. Examples of known valve closure systems include electromechanical actuators and pneumatic actuators.

The following U.S. Pat. Nos. show various shut-off valve operating systems: 4,633,897; 4,872,482; 5,257,771; 5,340,078; and 5,588,637.

SUMMARY OF THE INVENTION

The present invention relates to a new and improved valve closure system for a fluid-containing vessel that provides several important advantages and benefits. The term "fluid" includes both liquids and gases. Briefly, the invention comprises, in the disclosed preferred embodiment, an organization and arrangement of a relatively small number of individual parts that can be quickly and conveniently assembled to a shut-off valve of a vessel, such as a gas cylinder. A number of the parts are commercially available, and include an air motor as the prime mover for operating the shut-off valve. It is believed that an air motor offers certain advantages over an electric actuator, although certain principles of the invention are generic to various types of actuators, including both electric and pneumatic ones. The preferred embodiment of the inventive system is well suited for use with known, and commonly used, gas shut-off valves, although here too certain principles are generic to use of the inventive system with different forms of shut-off valves. Certain principles of the invention may also extend to valve closure systems in which the storage medium is a form of storage vessel other than the particular container and cylinder vessels mentioned above.

One generic aspect of the claimed invention relates to a valve closure system for rotating a rotatable actuator of a valve relative to a body of the valve to operate the valve from open to closed. The system comprises a motor having a rotatable shaft, a mounting that comprises plural parts including a bracket, for associating the motor with the valve, and a coupling for coupling the motor shaft to the valve actuator to impart rotation of the motor shaft to the valve actuator to operate the valve closed. The bracket comprises a plate having a surface defining a notch that has a) an entrance at a perimeter of the plate and b) a shape enabling the plate to associate with the valve body by i) disposing the plate alongside the valve body with the notch entrance aligned with the valve body and ii) then moving the plate laterally of the valve actuator axis to cause of the valve body to pass through the notch entrance and enter the notch. One of the parts is disposed on the plate and protrudes from the plate to present a dimensional interference with the valve body axially, as measured along the actuator axis, beyond the portion of the valve body disposed within the notch, for keeping the valve body disposed in the notch and preventing the plate from rotating on the valve body as the motor operates to close the valve.

Another generic aspect of the claimed invention relates to a valve and associated system for operating the valve. The valve comprises a valve body and a rotatable actuator that is rotatable about an axis relative to the valve body to operate the valve between open and closed positions. The valve body comprises a circular external groove that is coaxial with the actuator axis. The system for turning the valve actuator about its axis comprises a motor having a rotatable shaft, a mounting, comprising plural parts including a bracket, for associating the motor with the valve, and a coupling for coupling the motor shaft to the valve actuator to impart rotation of the motor shaft to turn the valve actuator. The bracket comprises a plate having a surface defining a notch that has a) an entrance at a perimeter of the plate and b) a shape enabling the plate to associate with the valve body by i) disposing the plate alongside the valve body with the notch entrance aligned with the circular external groove in the valve body and ii) then moving the plate laterally of the valve actuator axis to cause the external groove of the valve body to pass through the notch entrance, enter the notch and capture the plate on the valve body between confronting sides of the groove that are spaced apart along the direction of the axis of the actuator. A portion of the system presents dimensional interference with the valve body for preventing the valve body from escaping from the notch via the notch entrance and the bracket from rotating on the valve body as the motor shaft turns the valve actuator.

BRIEF DESCRIPTION OF DRAWINGS

The accompanying drawings, which are incorporated herein and constitute part of this specification, include one or more presently preferred embodiments of the invention, and together with the written description given herein disclose principles of the invention in accordance with a best mode contemplated at this time for carrying out the invention.

DETAILED DESCRIPTION

Figure 1:
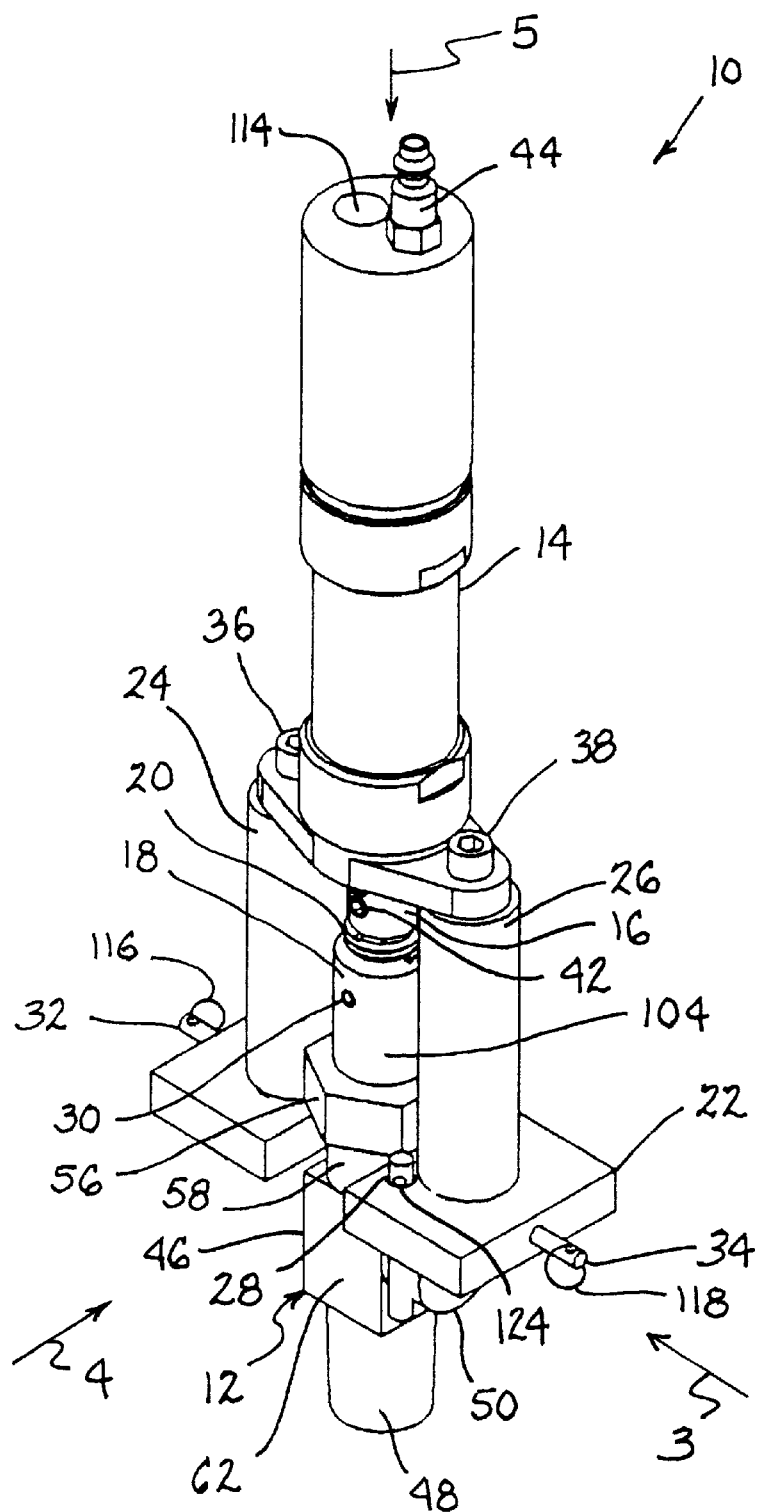
FIG. 1 is a perspective view showing a presently preferred embodiment of valve closure system according to the present invention in association with a shut-off valve, such as a shut-off valve of a gas cylinder.

The drawing Figures illustrate a presently preferred embodiment of cylinder valve closure system 10 according to principles of the invention in association with a cylinder valve 12. System 10 includes a motor 14, a male drive coupler 16, a female drive coupler 18, a spring 20, a bracket 22, two bracket support arms 24, 26, an anchor pin 28, a coupler pin 30, two side pins 32, 34, two screws 36, 38, two set screws 40, 42, and a quick-connect type fitting 44.

Valve 12 is a commercially available cylinder tank shut-off valve that comprises a body 46 having a first port 48 at the bottom and a second port 50 at a side. Port 48 is adapted to fit in sealed closure of an opening in a neck at the top of a gas cylinder (not shown). Port 50 is adapted for connection to a gas supply source when the cylinder is to be filled with gas. When the cylinder is in use at a facility, port 50 is connected to a gas handling system through which gas can flow from the cylinder to a point of use at the facility.

Valve 12 further includes an operating mechanism comprising a valve element within body 46 that is operated to open and close an internal gas flow path between ports 48 and 50. The valve element is operated by turning an actuator, which for the illustrated valve, is a stem 52 on the exterior of body 46. The turning of stem 52 occurs about an axis 54. Stem 52 has a polygonally-shaped transverse cross section (a square shape in the drawing) that can be engaged by a complementary shaped tool or socket for turning the stem. At the location where stem 52 protrudes from valve body 46 is a hexagonal-shaped head 56 that is concentric with axis 54. Immediately below, and concentric with head 56, is a circular cylindrical wall 58 that endows valve body 46 with a circular groove 60 between head 56 and a lower rectangular body portion 62.

Figure 2:
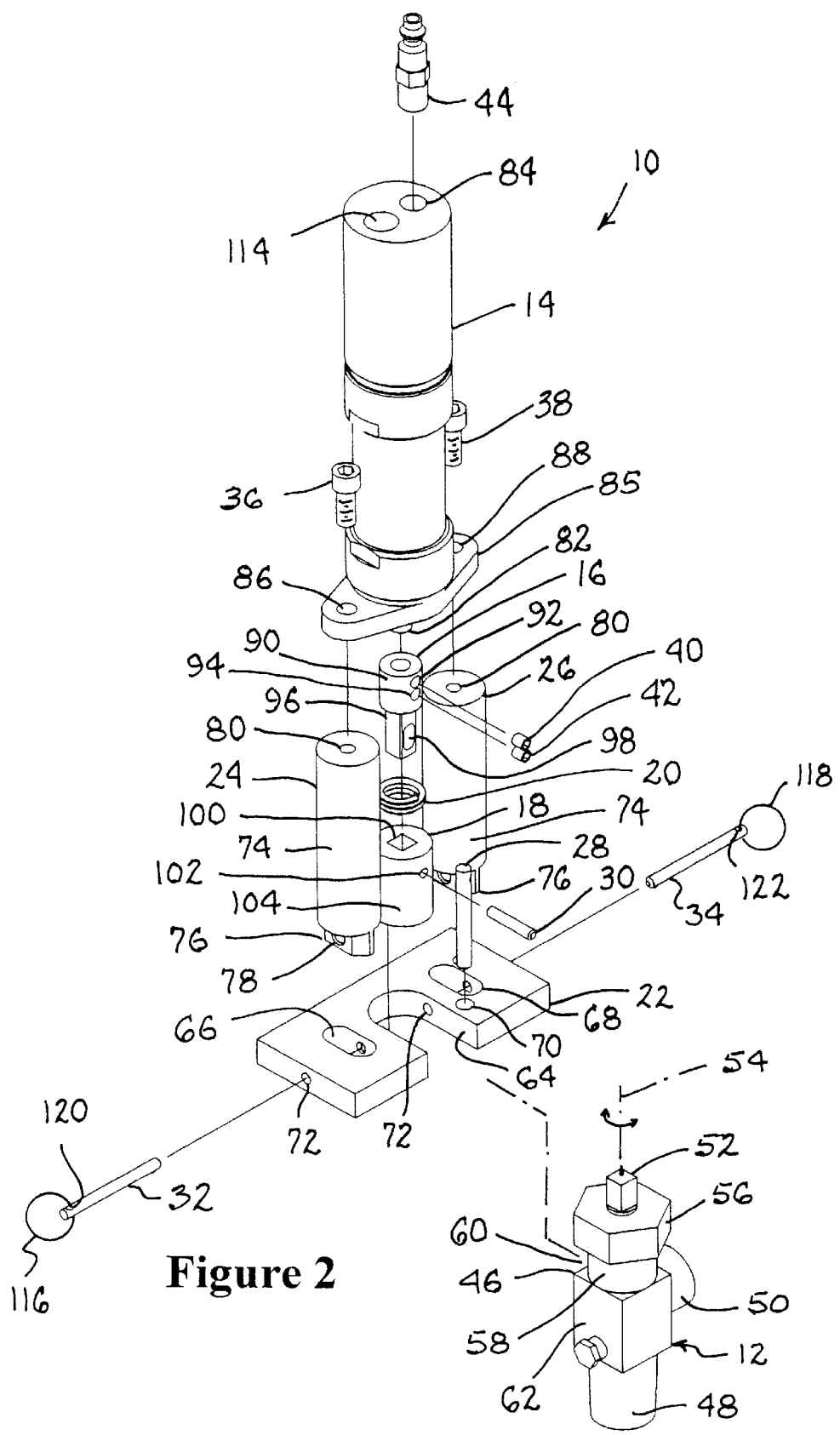
FIG. 2 is an exploded view of FIG. 1, but from a different perspective.
Figure 5:
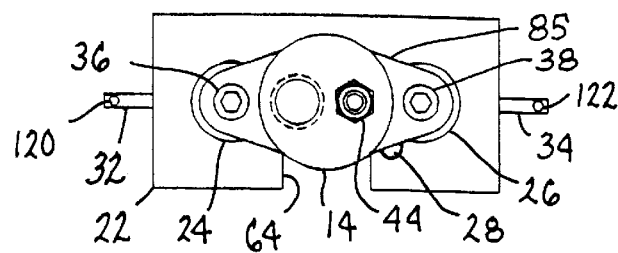
FIG. 5 is a top plan view in the direction of arrow 5 in FIG. 1.
Figure 3:
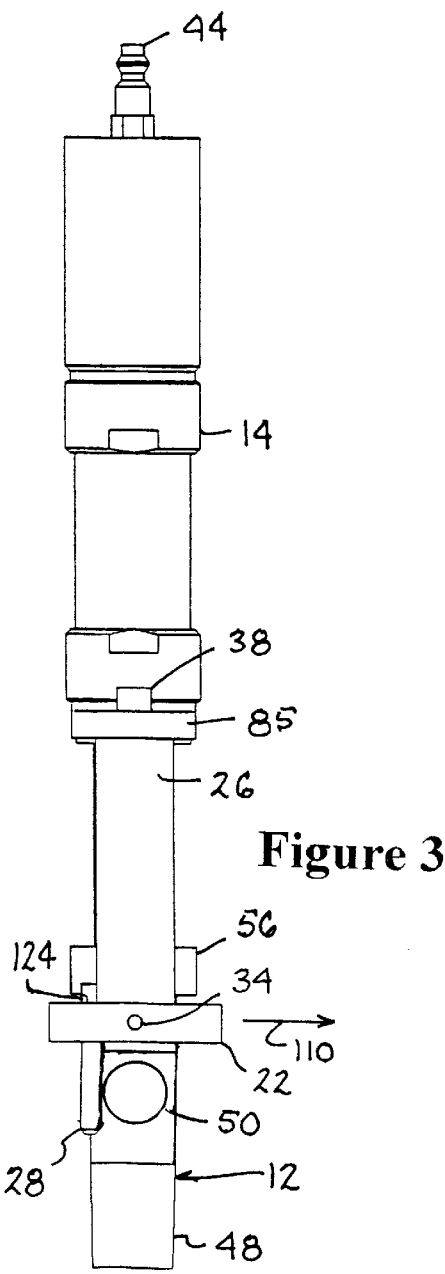
FIG. 3 is a side elevation view in the direction of arrow 3 in FIG. 1.
Figure 4:
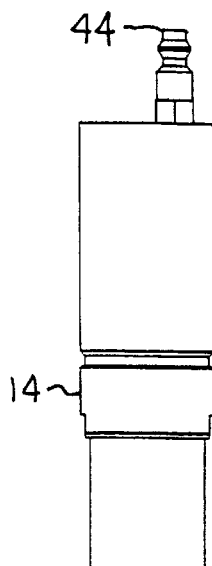
FIG. 4 is a front elevation view in the direction of arrow 4 in FIG. 1.
Figure 4:
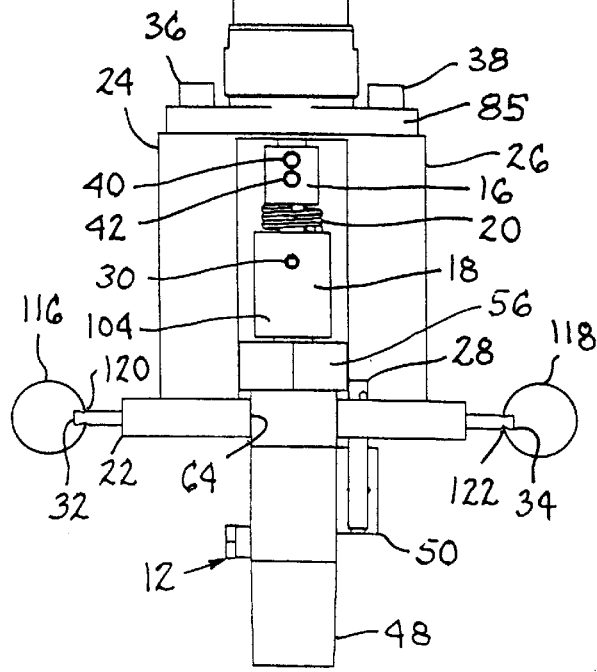
Figure 6:
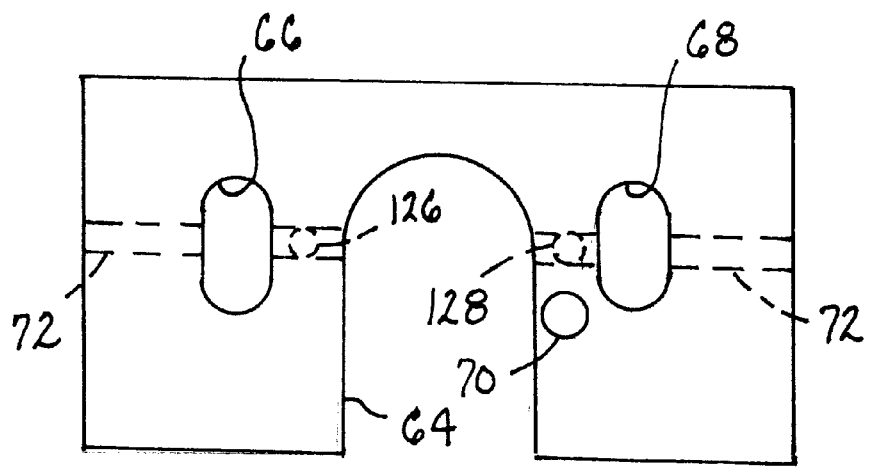
FIG. 6 is a top plan view of one of the parts of the system, namely a bracket, shown by itself.

Bracket 22 comprises a flat metal plate of uniform thickness. Bracket 22, as viewed in plan, may be considered to have somewhat of a general U- or C-shape by virtue of a U- or C-shaped notch 64 that opens to one of the longer two sides of an otherwise rectangular plan shape. Notch 64 is located centrally along the longer dimension of bracket 22, being equidistant from the two shorter sides. Notch 64 has a depth that extends widthwise of bracket 22 somewhat more than one-half the bracket width. To either side of notch 64, and centered widthwise of bracket 22 and at equal distances from notch 64 are two oval through-holes 66, 68 whose long dimensions are parallel to the shorter sides of bracket 22. Bracket 22 comprises two more holes, a through-hole 70 extending through the thickness of the bracket and a through-hole 72 extending parallel to the longer sides of the bracket midway between the shorter bracket sides at the midpoint of the bracket's thickness. FIG. 2 shows that hole 72 intersects hole 66, notch 64, and hole 68. That Figure also shows hole 70 to be located lengthwise of the bracket between notch 64 and hole 68 and widthwise of the bracket between hole 72 and the longer bracket side to which notch 64 opens.

Bracket support arms 24, 26 are identical. Each comprises a circular cylindrical body 74 from the lower axial end of which protrudes a tab 76 that lies generally on a diameter of body 74. The respective tabs 76 are constructed to fit in respective holes 66, 68 with the lower ends of the respective bodies 74 resting on the upper bracket surface along margins of the holes. Each tab further comprises a respective through-hole 78 that aligns with through-hole 72 when tabs 76 are disposed in holes 66, 68. Side pin 32 is inserted into one end of through-hole 72 and through through-hole 78 of support arm 24 to span hole 66 and thereby pin support arm 24 to bracket 22. Similarly, side pin 34 is inserted into the other end of through-hole 72 and through through-hole 78 of support arm 26 to span hole 68 and thereby pin support arm 26 to bracket 22. When assembled to bracket 22, neither side pin 32, 34 is long enough to intrude into notch 64. A threaded blind hole 80 centrally located in the upper end of each body 74 provides for attachment of motor 14.

Motor 14 is a commercially available air motor having an output shaft 82 at one axial end. Fitting 44 is installed in an air supply port 84 at the opposite axial end. A pneumatic line (not shown) connects to fitting 44 to provide pressurized air for operating motor 14. At the same axial end of motor 14 as shaft 82 the motor body has a flange 85 comprises diametrically opposite ears, each of which contains a respective through-hole 86, 88. Motor 14 attaches to support arms 24, 26 by registering holes 86, 88 with holes 80 of the respective support arms, passing the shanks of screws 36, 38 through the respective holes 86, 88, threading the screw shanks into the respective holes 80, and tightening the screws by turning the screw heads with a suitable tightening tool.

Male drive coupler 16 and female drive coupler 18 form a drive coupling of motor shaft 82 to valve stem 52. Male drive coupler 16 comprises a socket end 90 that fits onto the end of shaft 82. Set screws 40, 42 are threaded into respective radial holes 92, 94 in socket end 90 to bear radially against shaft 82 and thereby fasten male drive coupler 16 to the motor output shaft. Male drive coupler 16 further comprises a driving end 96 having a polygonally-shaped transverse cross section (shown as a square in the drawings). An oval-shaped through-hole 98 extends transversely through driving end 96.

Female drive coupler 18 is generally cylindrical. Its upper axial portion comprises a centrally located hole 100 having a transverse shape complementary to that of stem 52. A hole 102 extends from the outer cylindrical surface diametrically across coupler 18, intersecting hole 100. The lower axial portion of coupler 18 comprises a downwardly open socket 104 having an internal transverse shape complementary to that of stem 52.

Spring 20 is a helical-coiled compression spring having an inside diameter larger than the largest diameter of driving end 96 for fitting over driving end 96 to be captured in compression between couplers 16 and 18 when driving end 96 is inserted into hole 98. The two couplers 16, 18 are held in assembly by inserting pin 30 into hole 102 and through hole 98 to span hole 100.

FIGS. 1, 3, 4, and 5 show valve closure system 10 in operative association with shut-off valve 12. Removal from the valve can be easily accomplished by the following steps. Pins 32 and 34 are removed from through-hole 72, thereby unpinning support arms 24 and 26 from bracket 22. The assembly that comprises motor 14 and the two support arms can then be separated from bracket 22, disengaging coupler 18 from valve stem 52. Anchor pin 28 is extracted from bracket 22, removing the anchor pin from an interference that it would otherwise have with the side wall of port 50. The bracket is now removed from the shut-off valve by sliding bracket 22 off valve body 46 in the direction indicated by the arrow 110 in FIG. 3. As the bracket is being slid off, the valve body slides through the open end of notch 64.

Installation of valve closure system 10 on valve 12 can be made by a reverse sequence of steps. When the valve closure system is installed on the valve, the long dimension of through-hole 98 allows only limited travel of pin 30 along the length of the through-hole, and hence only limited travel of coupler 18 on driving end 96 of coupler 16. The limited travel serves to accommodate axial travel of stem 52 as the stem is being rotated, but it does not allow coupler 18 to lose driving engagement with stem 52 while the system remains installed. The closure system is installed on a shut-off valve when the valve is open.

Features serve to maintain the system operatively associated with the valve when the system is installed as shown by FIGS. 1, 3, 4, and 5. Spring 20 continually, imparts a downward bias force on coupler 18. The thickness of bracket 22 is slightly smaller than the axial dimension of groove 60 so that the bracket is closely axially captured between head 56 and valve body portion 62. With anchor pin assembled to bracket 22, it is disposed closely alongside port 50 thereby presenting a dimensional interference to that port for preventing the bracket from being slid off.

Because system 10 is a valve closure system, motor 14 is preferably uni-directional so that when pneumatic power is applied to port 84, output shaft 82 will rotate only in the direction that produces valve closing. Hence, anchor pin 28 is disposed to the side of valve port 50 where any reaction torque than might tend to turn bracket 22 on the valve body when motor 14 is operated to close shut-off valve 12 will result in abutment of the anchor pin with the side of the valve port that prevents bracket turning. The other port 114 adjacent port 84 is an air exhaust port that is left open.

Depending upon the specific shut-off valve with which a closure system is to be associated, it may be important that the motor torque not exceed a certain maximum limit. For example, a valve manufacturer may specify that the maximum allowable torque applied to the stem be limited to 35 foot-pounds, in which case a motor that can deliver no more than that torque would used. Of course the motor must be capable of delivering sufficient torque to close the shut-off valve when closing is called for.

Figure 7:
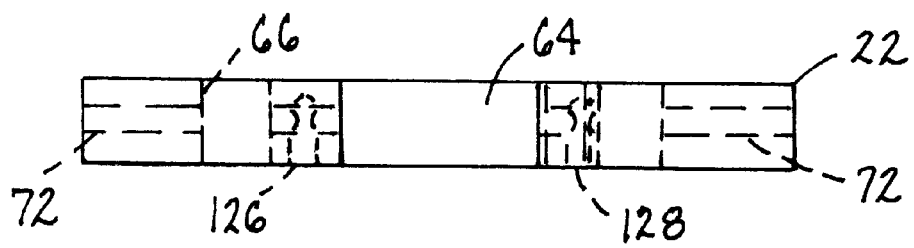
FIG. 7 is a front elevation view of FIG. 6.
Figure 8:
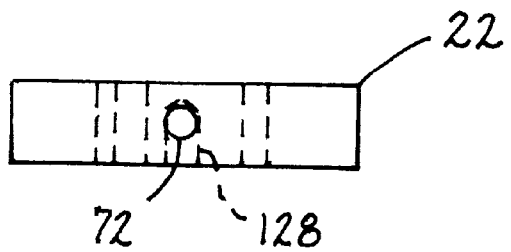
FIG. 8 is a right side elevation view of FIG. 6.

Each pin 32 and 34 may have a respective pull ring 116, 118 attached to its respective proximal end by passing the ring through a respective hole 120, 122. The pull ring can be a suitably strong, circularly shaped wire whose open area is large enough for the end of a person's forefinger to pass through and pull the respective pin out of through-hole 72. Anchor pin 28 may also have such a pull ring attached to it via a hole 124. Distal end portions of pins 32 and 34 may contain spring-loaded detent balls (not shown) that resiliently seat in holes that intersect the respective bracket holes into which the respective pins are inserted. FIGS. 7, 8, and 9 show such intersecting holes 126, 128 which intersect through-hole 72 to respective sides of notch 64. A distal end portion of anchor pin 28 may also have a spring-loaded detent ball (not shown) that, when the anchor pin is installed on bracket 22, is disposed just beyond hole 70 on the opposite side of hole 70 from the side to which the pull ring on the anchor pin is disposed. When any one of the pins is pulled out of the respective hole, the protruding portion of the spring-loaded ball retracts into the pin and out of dimensional interference with the hole until the pin has been extracted sufficiently to clear the ball from the hole.

It should be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A valve closure system for rotating a rotatable actuator of a valve relative to a body of the valve to operate the valve from open to closed, the system comprising:

a motor having a rotatable shaft;

a mounting, comprising plural parts including a bracket, for associating the motor with the valve;

a coupling for coupling the motor shaft to the valve actuator to impart rotation of the motor shaft to the valve actuator to operate the valve closed;

wherein the bracket comprises a plate having a surface defining a notch that has a) an entrance at a perimeter of the plate and b) a shape enabling the plate to associate with the valve body by i) disposing the plate alongside the valve body with the notch entrance aligned with the valve body and ii) then moving the plate laterally of the valve actuator axis to cause of the valve body to pass through the notch entrance and enter the notch;

and wherein one of the parts is disposed on the plate and protrudes from the plate to present a dimensional interference with the valve body axially, as measured along the actuator axis, beyond the portion of the valve body disposed within the notch, for keeping the valve body disposed in the notch and preventing the plate from rotating on the valve body as the motor operates to close the valve.

2. A valve closure system as set forth in claim 1 in a which the one part comprises a pin removably fitting in a hole in the plate and protruding out of the hole.

3. A valve closure system as set forth in claim 2 in which the surface defining the notch comprises a side that forms a corner with the perimeter of the plate at the entrance of the notch, and the hole in which the pin removably fits is disposed adjacent that side of the notch surface and spaced from the corner.

4. A valve closure system as set forth in claim 1 in which the surface defining the notch comprises confronting side surfaces extending from the perimeter of the plate and bounding sides of the notch, and the plural parts include a pair of upright members that are disposed upright on the plate, each proximate a respective side surface of the notch, and fasteners fastening the motor to the upright members.

5. A valve closure system as set forth in claim 4 in which the motor comprises an air motor having a mounting flange disposed atop and fastened to the pair of upright members by the fasteners, with the motor shaft aligned with the valve actuator axis.

6. A valve closure system as set forth in claim 1 in which the motor is disposed with its shaft aligned with the valve actuator axis, and the coupling comprises a male drive coupler on the motor shaft driving a female drive coupler having a drive socket fitted to the valve actuator, with the two couplers having an axial lost-motion connection that allows the female drive coupler to travel axially of the male drive coupler as the motor operates to close the valve.

7. A valve closure system as set forth in claim 6 in which the axial lost-motion connection comprises a pin that passes transversely through apertures in the couplers, with one of the apertures comprising an axially elongate slot within which the pin travels to provide the lost-motion.

8. A valve closure system as set forth in claim 7 including a spring disposed between the two couplers for resiliently biasing the female coupler axially away from the male coupler, and in which the axially elongate slot is closed at opposite axial ends to define limits of the lost-motion.

9. A valve closure system as set forth in claim 1 in which the plural parts include at least one upright member that is disposed upright on the plate to support the motor on the plate, the upright member comprises a base having a tab fitting in a first hole in the plate and a margin resting on the plate around the margin of the first hole in the plate, a second hole in the plate transversely intersects the first hole, and the upright member is pinned to the plate by a removable pin that passes through the second hole in the plate and a hole in the tab of the upright.

10. A valve comprising a valve body and a rotatable actuator that is rotatable about an axis relative to the valve body to operate the valve between open and closed positions, wherein the valve body comprises a circular external groove that is coaxial with the actuator axis, and a system for turning the valve actuator about its axis which comprises:

a motor having a rotatable shaft;

a mounting, comprising plural parts including a bracket, for associating the motor with the valve;

a coupling for coupling the motor shaft to the valve actuator to impart rotation of the motor shaft to turn the valve actuator;

wherein the bracket comprises a plate having a surface defining a notch that has a) an entrance at a perimeter of the plate and b) a shape enabling the plate to associate with the valve body by i) disposing the plate alongside the valve body with the notch entrance aligned with the circular external groove in the valve body and ii) then moving the plate laterally of the valve actuator axis to cause the external groove of the valve body to pass through the notch entrance, enter the notch and capture the plate on the valve body between confronting sides of the groove that are spaced apart along the direction of the axis of the actuator;

and wherein a portion of the system presents dimensional interference with the valve body for preventing the valve body from escaping from the notch via the notch entrance and the bracket from rotating on the valve body as the motor shaft turns the valve actuator.

11. A valve and closure system as set forth in claim 10 in which the portion of the system that presents dimensional interference with the valve body for preventing the valve body from escaping from the notch via the notch entrance and the bracket from rotating on the valve body as the motor shaft turns the valve actuator comprises a part that is disposed on the plate and protrudes from the plate.

12. A valve and closure system as set forth in claim 11 in which the part that is disposed on the plate and protrudes from the plate comprises a pin removably fitting in a hole in the plate and protruding out of the hole alongside the valve body immediately adjacent the groove in the valve body.

13. A valve and closure system as set forth in claim 12 including a pull ring for extracting the pin from the hole.

14. A valve and closure system as set forth in claim 13 in which the parts include two upright members that are disposed upright on the plate on opposite sides of the notch to support the motor on the plate, each upright member comprises a base engaging the plate, and a respective removable pin pins each upright member to the plate and includes a pull ring for unpinning the respective upright from the plate.

15. A valve and closure system as set forth in claim 14 in which the motor comprises an air motor having a mounting flange disposed atop and fastened to the two upright members by the fasteners, with the motor shaft aligned with the valve actuator axis.

16. A valve and closure system as set forth in claim 10 in which the motor is disposed with its shaft aligned with the valve actuator axis, and the coupling comprises a male drive coupler on the motor shaft driving a female drive coupler having a drive socket fitted to the valve actuator, with the two couplers having an axial lost-motion connection that allows the female drive coupler to travel axially of the male drive coupler as the motor operates to close the valve.

17. A valve and closure system as set forth in claim 16 in which the axial lost-motion connection comprises a pin that passes transversely through apertures in the couplers, with one of the apertures comprising an axially elongate slot within which the pin travels to provide the lost-motion.

18. A valve and closure system as set forth in claim 17 including a spring disposed between the two couplers for resiliently biasing the female coupler axially away from the male coupler, and in which the axially elongate slot is closed at opposite axial ends to define limits of the lost-motion.

19. A valve and closure system as set forth in claim 10 in which the motor shaft turns in a given direction to operate the valve from open to closed when the motor operates, and the portion of the system that presents dimensional interference with the valve body for preventing the valve body from escaping from the notch via the notch entrance and the bracket from rotating on the valve body as the motor shaft turns the valve actuator is disposed to prevent the bracket from turning opposite that given direction.

* * * * *